(12) United States Patent
Jenkins et al.

(10) Patent No.: US 8,275,029 B2
(45) Date of Patent: Sep. 25, 2012

(54) CONTINUOUS TIME—DECISION FEEDBACK EQUALIZER

(75) Inventors: Philip Jenkins, Eden Prairie, MN (US); Cathy Ye Liu, San Jose, CA (US); Mark Marlett, Livermore, CA (US); Jeff Kueng, New Brighton, MN (US)

(73) Assignee: LSI Corporation, Milpitas, CA (US)

( * ) Notice: Subject to any disclaimer, the term of this patent is extended or adjusted under 35 U.S.C. 154(b) by 330 days.

(21) Appl. No.: 12/600,749

(22) PCT Filed: Oct. 3, 2007

(86) PCT No.: PCT/US2007/021279
§ 371 (c)(1),
(2), (4) Date: Nov. 18, 2009

(87) PCT Pub. No.: WO2009/045193
PCT Pub. Date: Apr. 9, 2009

(65) Prior Publication Data
US 2010/0150221 A1    Jun. 17, 2010

(51) Int. Cl.
*H03H 7/30* (2006.01)
*H03H 7/40* (2006.01)
*H03K 5/159* (2006.01)
(52) U.S. Cl. .................................. 375/233; 375/229
(58) Field of Classification Search .............. 375/233, 375/229
See application file for complete search history.

(56) References Cited

U.S. PATENT DOCUMENTS

| | | | |
|---|---|---|---|
| 7,421,022 B2 * | 9/2008 | Choudhary et al. | 375/233 |
| 7,505,515 B1 * | 3/2009 | Choudhary et al. | 375/233 |
| 7,764,732 B2 * | 7/2010 | Rollins et al. | 375/233 |
| 2005/0190832 A1 | 9/2005 | Ibragimov et al. | |
| 2005/0228294 A1 | 10/2005 | Yamaki | |
| 2006/0077082 A1 | 4/2006 | Shanks et al. | |
| 2006/0239341 A1 | 10/2006 | Marlett et al. | |
| 2007/0110199 A1 * | 5/2007 | Momtaz et al. | 375/350 |
| 2008/0304557 A1 * | 12/2008 | Hollis | 375/231 |

* cited by examiner

*Primary Examiner* — Shuwang Liu
*Assistant Examiner* — Nader Bolourchi
(74) *Attorney, Agent, or Firm* — Suiter Swantz pc llo

(57) ABSTRACT

An apparatus comprises a summer suitable for subtracting a filtered feedback signal from an input; a symbol decision device suitable for receiving an output from the summer; a feedback filter suitable for filtering an output from the symbol decision device and for sending the filtered feedback signal to the summer, the feedback filter comprising an adjustable swing amplifier and an adjustable pole filter; and an adaptation algorithm suitable for simultaneously adapting both a pole setting and a swing setting based upon a least mean squared error criteria. The summer, the symbol decision device, and the feedback filter form a feedback circuit utilized to reconstruct an electrical signal distorted during transmission.

19 Claims, 5 Drawing Sheets

| Case | $\Delta d_{1,k}$ | $\Delta d_{2,k}$ | $\Delta p_k$ | $\Delta g_k$ |
|---|---|---|---|---|
| a/b/c | UP (+1) | UP | – | UP |
| x | DN (-1) | UP | DN | DN |
| y | UP | DN | UP | UP |
| l/m/n | DN | DN | – | DN |

CONTINUOUS TIME—DECISION FEEDBACK EQUALIZER

CROSS REFERENCE TO RELATED APPLICATIONS

This application is a national phase application based on International Application No. PCT/US2007/021279, filed Oct. 3, 2007, the content of which is incorporated herein by reference in its entirety.

TECHNICAL FIELD

The disclosure generally relates to the field of decision feedback equalizers, and more particularly to a continuous time-decision feedback equalizer for reconstructing electrical signals that have been distorted during transmission.

BACKGROUND

A decision feedback equalizer (DFE) is used to reconstruct electrical signals that have been distorted during transmission over a communication channel. The equalizer pole and swing settings are adjusted (via programmable register or continuous analog settings) to undo the effects of distortion and thus attempt to reproduce the original transmitted signal at the receiver.

DFE settings have been either manually set or set with a fixed pole setting while the swing setting is optimally adapted over time using a known algorithm. The later method, as disclosed in U.S. Patent Application Publication No. 2006/0239341 filed Apr. 21, 2005, which is herein incorporated by reference in its entirety, are utilized for setting the DFE swing setting. Other methods may include the steps of 1) examining all possible combinations of settings; 2) measuring a performance metric such as the rate at which bit errors occur; and 3) setting the swing and pole to optimize the performance metric. These steps could be employed once at start up or repeated periodically to track variations over time.

SUMMARY

The disclosure is directed to an apparatus and a method for reducing signal distortion.

The apparatus comprises a summer suitable for subtracting a filtered feedback signal from an input; a symbol decision device suitable for receiving an output from the summer; a feedback filter suitable for filtering an output from the symbol decision device and for sending the filtered feedback signal to the summer, the feedback filter comprising an adjustable swing amplifier and an adjustable pole filter; and an adaptation algorithm suitable for simultaneously adapting both a pole setting and a swing setting based upon a least mean squared error criteria. The summer, the symbol decision device, and the feedback filter form a feedback circuit utilized to reconstruct an electrical signal distorted during transmission.

The method for reducing signal distortion comprises transmitting a feedback signal decision; filtering the feedback signal decision by utilizing an adaptation algorithm suitable for simultaneously adapting both a pole setting and a swing setting based upon a least mean squared error criteria to form a filtered feedback signal; and subtracting the filtered feedback signal from an incoming signal resulting in a net signal with less distortion.

It is to be understood that both the foregoing general description and the following detailed description are exemplary and explanatory only. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
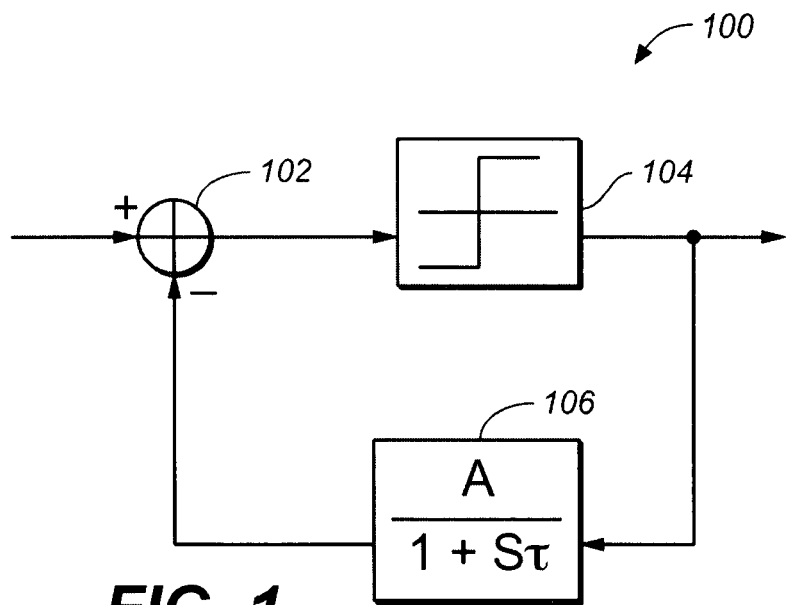
FIG. 1 is a block diagram illustrating a continuous time-decision feedback equalizer (CT-DFE)
Figure 2:
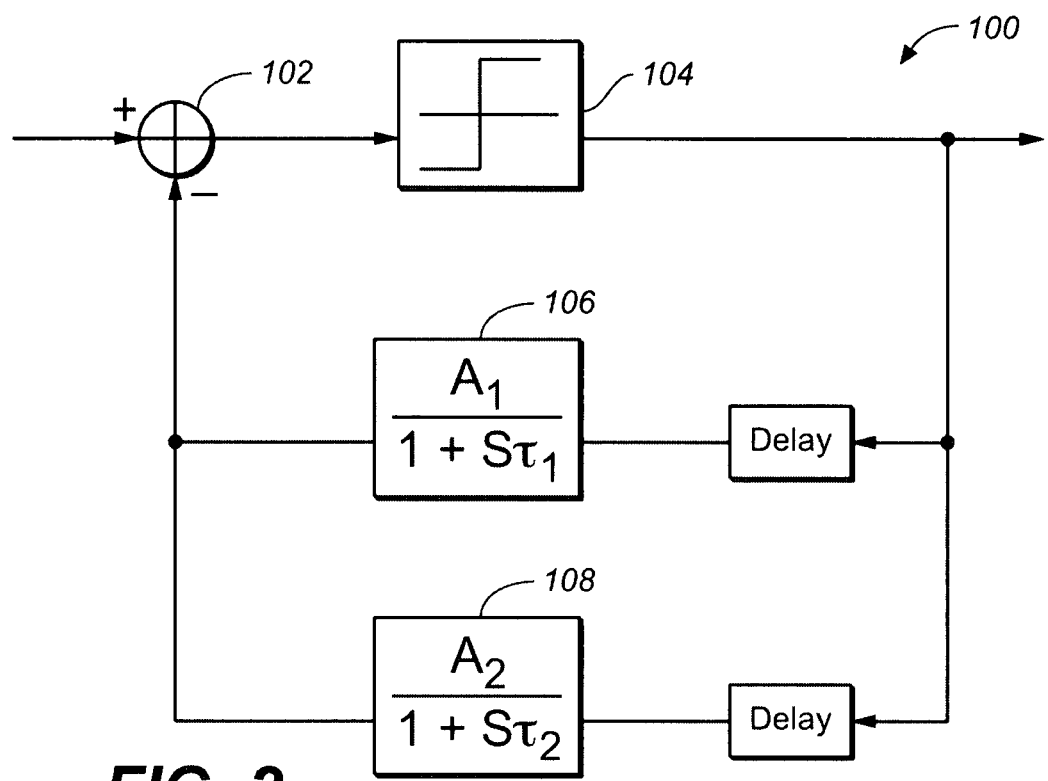
FIG. 2 is a block diagram illustrating a CT-DFE, wherein the CT-DFE utilizes a first feedback filter and a second feedback filter, wherein first feedback filter and the second feedback filter have independent pole and swing settings.

Referring to FIGS. 1 and 2 a block diagram of a continuous time decision feedback equalizer (CT-DFE) 100 is shown.

The CT-DFE 100 utilizes an algorithm that simultaneously adapts both swing and pole settings to optimally reproduce the original signal. The CT-DFE 100 does not require any manual settings of the swing settings and/or pole settings. Moreover, the CT-DFE 100 does not require extensive characterization of each application to ensure that the settings will function correctly over all application operating corners. The CT-DFE 100 is less expensive and time consuming than previously utilized manual methods. Further, the CT-DFE 100 reduces the rate of incorrect decisions (errors) brought on by variations in: 1) channel characteristics; 2) on-chip process (both transmission (TX) & receive (RX)); 3) on-chip voltage (both TX & RX); 4) on-chip temperature (both TX & RX); 5) on/off-chip noise; and 6) son/off-chip long term drift (both TX, RX & channel).

The CT-DFE 100 comprises a summer 102, a symbol decision device 104, and a feedback filter 106, as illustrated in FIGS. 1 and 2.

The summer 102 receives an input from an incoming signal and receives an output from the feedback filter 106. The summer 102 subtracts the output from the feedback filter 106 from the input and/or the incoming signal resulting in a net signal with less distortion in attempting reconstruct the original signal.

The output from the summer 102 is received by the symbol decision device 104. The symbol decision device 104 sends a quantized detected symbol to the feedback filter 106 in a feedback circuit. The symbol decision device 104 sends the detected symbols on through the circuit to the receiver.

The feedback filter 106 is a linear, continuous time filter. The feedback filter 106 comprises an adjustable swing amplifier and an adjustable pole filter. The feedback filter 106 receives the output from the symbol decision device 104 and utilizes an algorithm that simultaneously adapts both swing and pole settings to produce an output signal that may be subtracted from the input signal in the summer to optimally reproduce the original signal. The algorithm utilized by the feedback filter 106 is referred to herein as the "adaptation algorithm". The adaptation algorithm determines the swing setting and the pole setting in the transfer function of $A/(1+s\tau)$ of the feedback filter 106, as illustrated in FIGS. 1 and 2. The swing (A) and transfer function pole ($1/\tau$) are adapted by the adaptation algorithm. The "s" symbol represents the complex frequency Laplace transform variable.

Figure 3A:
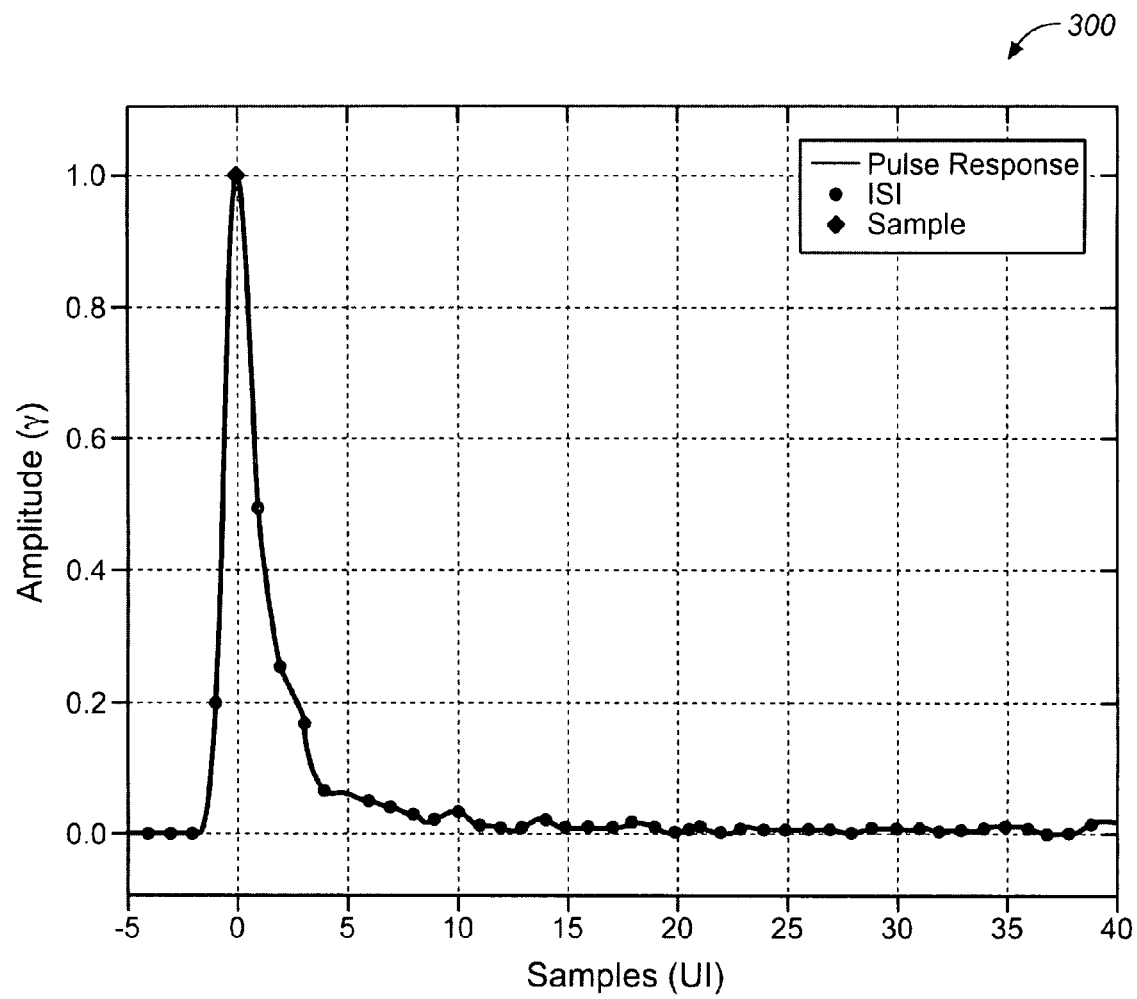
FIG. 3A is a graph illustrating a representative post-cursor intersymbol interference (ISI) amplitude in a pulse response.
Figure 3B:
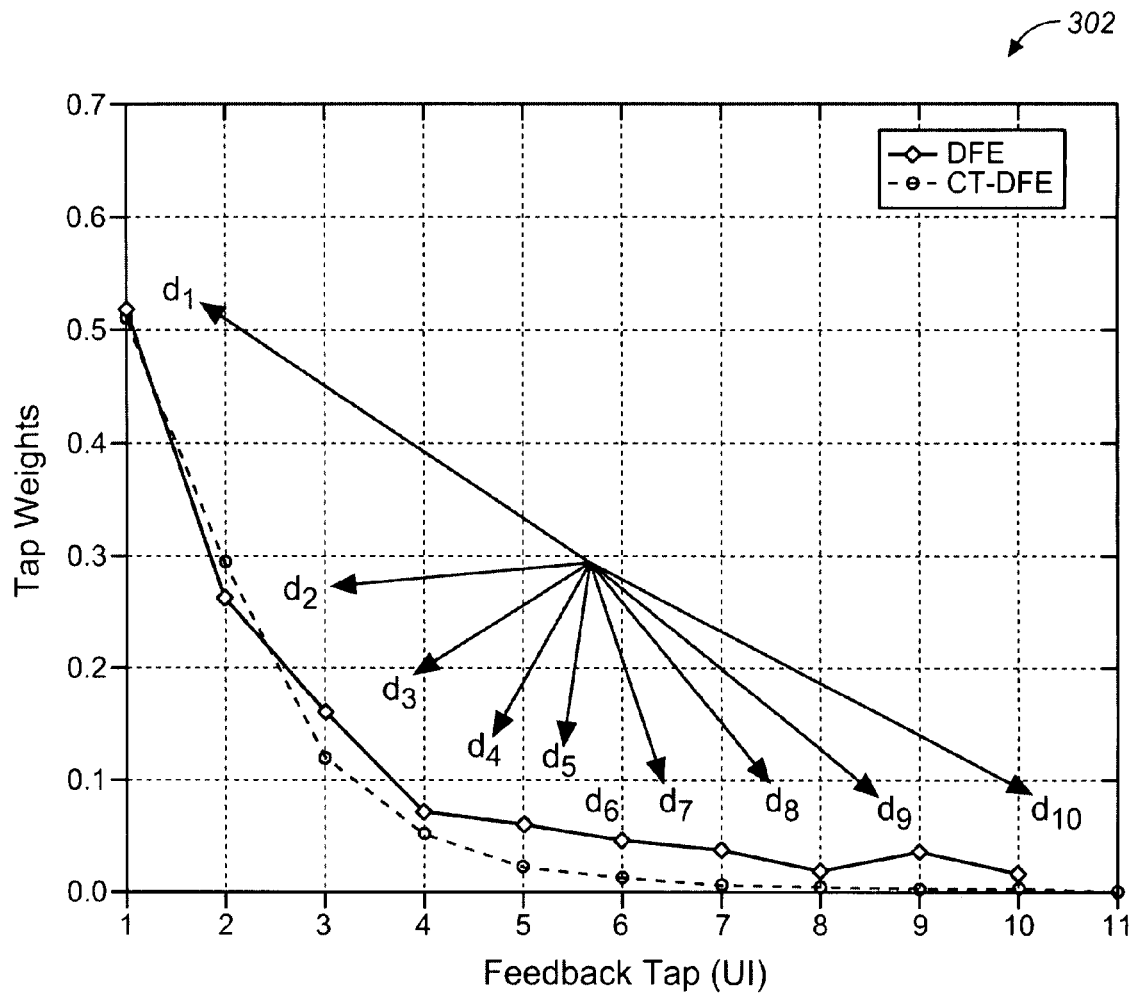
FIG. 3B is a graph which compares the CT-DFE and digital (discrete time) DFE response to post cursor tail illustrated in FIG. 3A.

In known DFEs, optimal digital DFE tap weights are normally proportional to the post-cursor intersymbol interference (ISI) amplitude in the pulse response, as illustrated in graph 300 in FIG. 3A. The feedback filter 106 of the CT-DFE 100 utilizes the best pole and swing values to emulate channel ISI or to have a close shape and height with the post-cursor tail, as illustrated in graph 302 in FIG. 3B where the CT-DFT pole is 1.2 GHz and the CT-DFT gain is 500 mv. For instance, T-spaced samples (at 1 T, 2 T, and 3 T to $T_n$) of CT-DFE's feedback pulse response should match with digital (discrete time) DFE's tap weights (d1, d2, and d3, to $d_n$), as illustrated in the graph 302 in FIG. 3B. the graph 302 in FIG. 3B. In an analogous fashion, the CT-DFE utilizes the same samples as the digital DFE algorithm to realize a least mean squared error criteria (LMS) in adapting the pole settings and swing settings for the CT-DFE 100.

The adaptation algorithm is derived based upon a fictitious 2 tap digital DFE utilizing a sign-sign variant of the well known LMS algorithm. Two different error criteria may provide different optimal results in a particular equalization application. In a 2 tap digital DFE, 2 tap weights, d1 and d2, are adapted over time to realize a least mean squared error criteria. The adaptation algorithm calls for the d1 and d2 tap weights to adapt according to:

$$d1(t_{n+1}) = d1(t_n) + \mu \cdot \Delta d1(t_n); \text{ and}$$

$$d2(t_{n+1}) = d2(t_n) + \mu \cdot \Delta d2(t_n)$$

where $\mu > 0$ is an adaptation gain coefficient which controls the rate at which the adaptation takes place. The adaptation algorithm adapts the CT-DFE swing and pole setting according to these results to determine the swing and pole setting for the transfer function. The adaptation algorithm follows a 1:1 mapping from $\Delta d1$, $\Delta d2$ to $\Delta$swing, $\Delta$pole settings. The adaptation algorithm utilizes fictitious tap weights, such as d1 and d2, which are based on real tap signal samples.

Figures 4A, 4B:
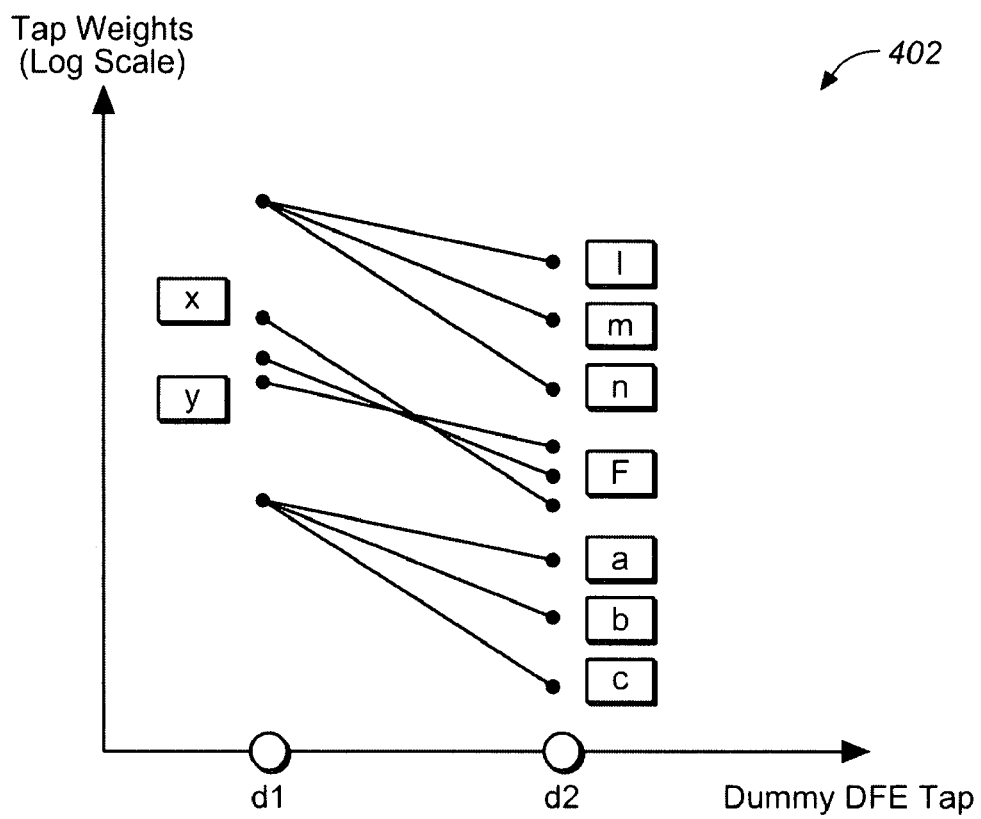
FIG. 4A is a table illustrating the 1:1 mapping of Δd1, Δd2 to Δswing settings, Δpole settings.
FIG. 4B is a graph illustrating the plotting of cases that will adapt towards the ideal CT-DFE response at times corresponding to the signals at taps d1 and d2 as shown in the table of FIG. 4A.

The CT-DFE pole and swing setting are adapted together based on the information of $\Delta d_{1,k}$ and $\Delta d_{2,k}$ as shown in table 400 and graph 402 in FIGS. 4A and 4B. As used herein the symbol "$\Delta$" refers to the phrase "change of." As used herein the subscript "k" refers to the k-th time sample. The table 400 describes the 1:1 mapping of $\Delta d1$, $\Delta d2$ to $\Delta$swing, $\Delta$pole settings, as illustrated in FIG. 4A. The graph 402 illustrates an ideal CT-DFE response, delineated as curve F, at times corresponding to the signals at taps d1 and d2, as illustrated FIG. 4B. The remaining curves in the graph 402 in FIG. 4B illustrate cases that will adapt towards curve F over time by utilizing the adaptation algorithm. Both d1 and d2 need to be increased as indicated by the positive $\Delta d1$ and $\Delta d2$ in cases a, b, and c, as illustrated in table 400 and graph 402. Curves a, b, and c correspond to a necessary positive $\Delta$swing and no change in pole, as illustrated in table 400 in FIG. 4A. Both d1 and d2 need to be decreased as indicated by the negative $\Delta d1$ and $\Delta d2$ in cases l, m, and n, as illustrated in table 400 and graph 402. Curves l, m, and n correspond to a necessary negative $\Delta$swing with no change in pole, as illustrated in table 400 in FIG. 4A. In case x, $\Delta d1 = -1$ and $\Delta d2 = 1$; therefore, the swing and pole both need to be decreased, as illustrated in table 400 and graph 402. In case y, $\Delta d1 = 1$ and $\Delta d2 = -1$; therefore, the swing and pole both need to be increased, as illustrated in table 400 and graph 402.

A second feedback filter 108 may be added to the feedback circuit as illustrated in FIG. 2. The utilization of two feedback filters 108 may require signal delay. The adaptation algorithm is utilized in both the feedback filter 106 and the feedback filter 108; therefore, both swing ($A_1, A_2$) and pole ($1/\tau_1, 1/\tau_2$) are adaptable. The two feedback filters 106 and 108 can target two different post cursor tail slopes. The feedback filter 106 can target d1 and d2 with a larger pole and gain and feedback filter 108 can target d3 to $d_n$ with smaller pole and gain. The feedback filter 106 may utilize $\Delta d_{1,k}/\Delta d_{2,k} \to \Delta p_{1,k}/\Delta g_{1,k}$ and feedback filter 108 may utilize $\Delta d_{3,k}/\Delta d_{4,k} \to \Delta p_{2,k}/\Delta g_{2,k}$. This description of two feedback filters is not restrictive. It is contemplated that numerous feedback filters may be utilized in the feedback circuit without departing from the scope and intent of the disclosure.

Figure 5:
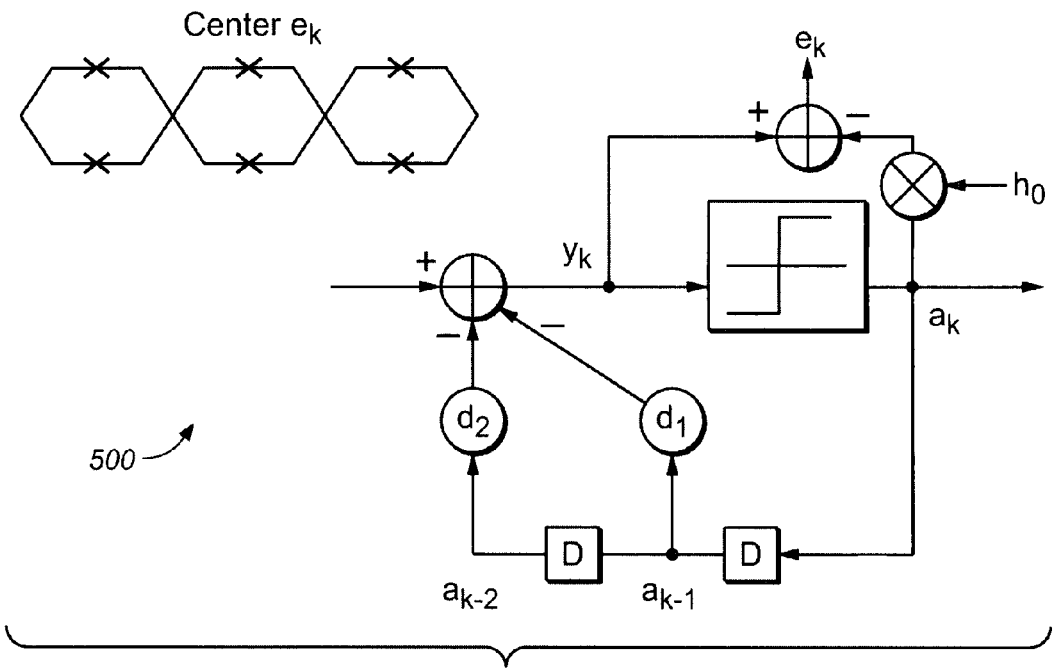
FIG. 5 is a block diagram illustrating a center based equalization.
Figure 6:
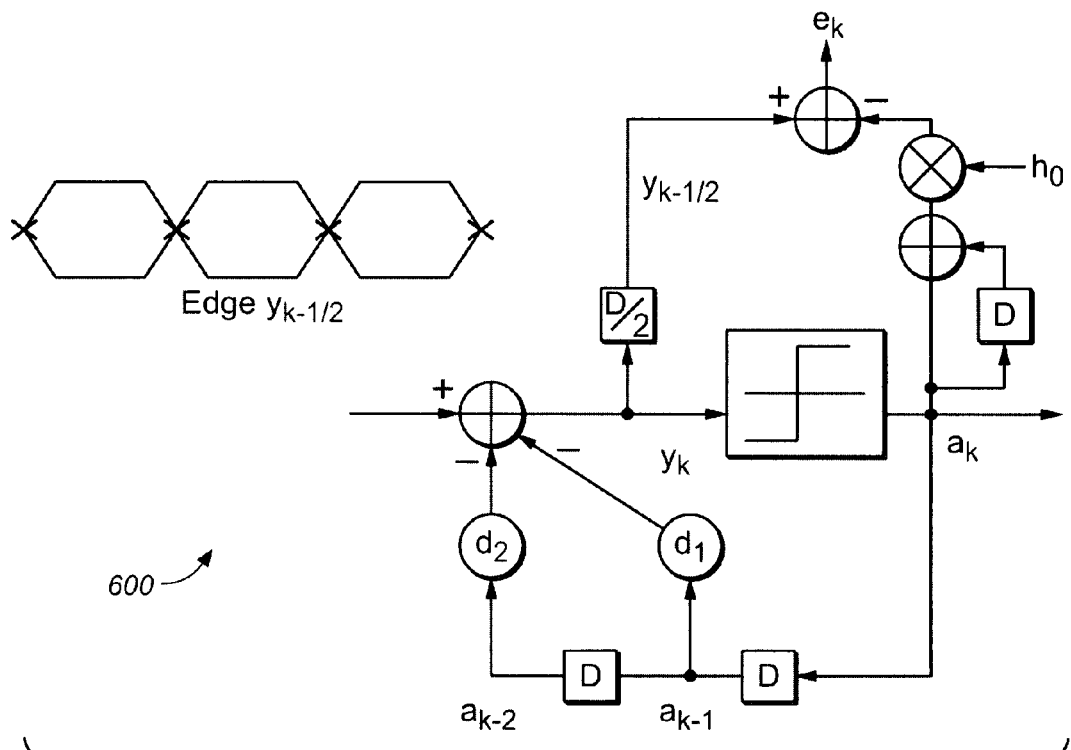
FIG. 6 is a block diagram illustrating an edge based equalization.

Two different error criteria may provide optimal results in two different equalization applications: center based equalization 500 and edge based equalization 600, as illustrated in FIGS. 5 and 6. The two adaptation error criteria allow least mean squared error performance in two different and complementary system applications.

The sign-sign variant of the well known LMS algorithm for the center based equalization is realized as follows:

$$\Delta d_{1,k} = sgn(e_k) * sgn(a_{k-1})$$

$$\Delta d_{2,k} = sgn(e_k) * sgn(a_{k-2})$$

$$e_k = y_k - h_0 * a_k.$$

Symbol decision samples at time k occur in the middle of the data bit, as illustrated in FIG. 5. The error criteria for the center based equalization is utilized to minimize the mean squared error of the difference of the mid window sample and the $h_0$ scaled offset of the mid window sample. The $h_0$ sets the mean level of the mid level sample and may be a fixed level or adapted separately as part of a pre-equalizer automatic gain control loop.

For the center based equalization, the error criteria results in least mean squared error of the difference between the mid level signal sample and the respective target level $(+/-)h_0$ of the mid level signal sample. The error criteria are usually achieved at the expense of the width of the transition window. Therefore, the center based equalization is particularly valuable in optical communication links applications where the optical power levels may be limited. The $h_0$ level may be preset or adaptively set under control of a pre-equalizer automatic gain control loop.

The error criteria for edge based equalization are utilized to minimize the edge transition window. The sign-sign variant of the well known LMS algorithm for the edge based equalization is realized as follows:

$$\Delta d_{1,k} = sgn(e_k) * sgn(X_{k-3/2}), X_{k-3/2} = a_{k-1} + a_{k-2}$$

$$\Delta d_{2,k} = sgn(e_k) * sgn(X_{k-7/2}), X_{k-7/2} = a_{k-3} + a_{k-4}$$

$$e_k = y_{k-1/2} - h_0 * (a_k + a_{k-1}).$$

Data samples at time k occur in the middle of the data bit while transitions occur around time k−1/2, as illustrated in FIG. 6. A scaling coefficient of $h_0 = 0.5$ forces $e_k$ to zero except during a transition sample. During a transition sample, $e_k$ indicates a leading or lagging transition. Furthermore, k−3, k−4, samples are required for Δd1, Δd2 to take on different signs, which is required for pole adaptation.

For the edge based equalization, the error criteria results in the least mean square window duration through which transition crossings occur. This is a minimum for a single pole feedback CT-DFE system and is a function of the channel and any transmit filter equalization. The minimum transition window is generally achieved at the expense of the mid eye height. Therefore, the edge based equalization is particularly valuable in highly dispersive communication backplane channel applications where timing margin can be limited.

The disclosure further includes a method for reducing signal distortion. A continuous time adaptive feedback loop transmits a feedback signal decision that is subtracted from an input signal to reduce distortion in the input signal. The adaptive feedback loop may filter the feedback signal decision with a linear filter utilizing an adaptation algorithm suitable for simultaneously adapting both a pole setting and a swing setting based upon a least mean squared error criteria to form a filtered feedback signal. The feedback signal may implement center based equalization to minimize the mean squared error of the difference between mid-window samples and a desired amplitude for the input signal. The desired gain may be fixed, set manually, or determined adaptively through a pre-equalizer automatic gain adjustment feedback loop. Alternatively or additionally, the feedback signal may implement center based equalization to minimize a means squared window duration through which transition crossings occur in the input signal. The feedback signal is subtracted from the incoming input signal resulting in a net signal with less distortion. These adaptive feedback filters may be executed individually as shown in FIG. 1 or in combination as in FIG. 2. The mid-window amplitude control circuit is shown in greater detail in FIG. 5 and the transition crossing window duration control circuit is shown in greater detail in FIG. 6.

The CT-DFE 100 and the method for reducing signal distortion 700 may be utilized in a communication based system. However, the mapping of linearly combined tap weights can be applied into any electromechanical or similar system that involves a feedback signal decision that is filtered by a linear filter such as described within this disclosure.

Therefore, the disclosure describes a CT-DFE 100 and a method for reducing signal distortion 700 that simultaneously adapts swing and pole settings. The adaptation algorithm of the CT-DFE 100 and method 700 utilizes a 1:1 mapping between changes to the tap weights of a fictitious 2 tap DFE and the swing and pole changes entered into the transfer function. Furthermore, the CT-DFE 100 and method 700 provide a way to achieve least mean squared error performance within a communication system. Moreover, the CT-DFE 100 and method 700 compensate for system variations due to: 1) channel characteristics; 2) on-chip process (both TX & RX); 3) on-chip voltage (both TX & RX); 4) on-chip temperature (both TX & RX); 5) on/off-chip noise; and 6) on/off-chip long term drift (both TX & RX).

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory, it is the intention of the following claims to encompass and include such changes.

What is claimed is:

1. An apparatus implementing a continuous time-decision feedback equalizer, comprising:
    a summer suitable for subtracting a filtered feedback signal from an input signal;
    a symbol decision device suitable for receiving an output from the summer,
    a feedback filter suitable for filtering an output from the symbol decision device and for sending the filtered feedback signal to the summer, the feedback filter comprising an adjustable swing amplifier and an adjustable pole fitter;
    an adaptation algorithm suitable for simultaneously adapting both a pole setting and a swing setting based upon a least mean squared error criteria,
    wherein the summer, the symbol decision device, and the feedback filter form a feedback circuit utilized to reconstruct an electrical signal distorted during transmission; and
    wherein the least mean squared error criteria is configured to minimize a difference between mid-window symbol decision samples and a mean input level corresponding to a desired amplitude for the input signal.

2. The apparatus as claimed in claim 1, further comprising a second feedback filter suitable for further filtering of the output from the symbol decision device and for sending the filtered feedback signal to the summer, the second feedback filter comprising an adjustable swing amplifier and an adjustable pole filter.

3. The apparatus as claimed in claim 1, wherein the desired amplitude is fixed or set manually.

4. The apparatus as claimed in claim 1, wherein the desired amplitude is adaptively determined by a pre-equalizer automatic gain control loop.

5. The apparatus as claimed in claim 2, wherein the second feedback filter further comprises a second adaption algorithm configured to minimize a means squared window duration through which transition crossings occur in the input signal.

6. The apparatus as claimed in claim 5, wherein the continuous time-decision feedback equalizer is utilized in an optical communication link application.

7. The apparatus as claimed in claim 1, wherein the least mean squared error criteria is realized when $\Delta d1,k = \text{sgn}(ek)*\text{sgn}(Xk-3/2)$ where $Xk-3/2 = ak-1 + ak-2$ and $\Delta d2,k = \text{sgn}(ek)*\text{sgn}(Xk-7/2)$ where $Xk-7/2 = ak-3 + ak-4$ for an edge based equalization, and wherein $ek = yk-1/2 - h0*(ak+ak-1)$.

8. The apparatus as claimed in claim 7, wherein the continuous time-decision feedback equalizer is utilized in a communication backplane channel application.

9. The apparatus as claimed in claim 1, wherein the continuous time-decision feedback equalizer provides compensation for system variation due to at least one of a channel characteristic, an on-chip process, an on-chip voltage, an on-chip temperature, an on-chip noise, an off-chip noise, an off-chip long term drift, or an on-chip long term drift.

10. A method for reducing signal distortion in a continuous time-decision feedback equalizer, comprising:
    transmitting a feedback signal decision;

filtering the feedback signal decision by utilizing an adaptation algorithm suitable for simultaneously adapting both a pole setting and a swing setting based upon a least mean squared error criteria to form a filtered feedback signal;

subtracting the filtered feedback signal from an incoming signal resulting in a net signal with less distortion; and wherein the least mean squared error criteria is configured to minimize a means squared error of a difference between mid-window symbol decision samples and a mean input level corresponding to a desired amplitude for the incoming signal.

11. The method as claimed in claim 10, further comprising setting the desired amplitude manually or to a fixed value.

12. The method as claimed in claim 10, further comprising determining the desired amplitude adaptively with a pre-equalizer automatic gain control loop.

13. The method as claimed in claim 10, further comprising filtering the feedback signal decision with a second adaptation algorithm comprising a second feedback filter comprising an adjustable swing amplifier and an adjustable pole filter.

14. The method as claimed in claim 13, wherein the continuous time-decision feedback equalizer is utilized in an optical communication link application.

15. The method as claimed in claim 13, wherein the second adaption algorithm is configured to minimize a means squared window duration through which transition crossings occur in the incoming signal.

16. The method as claimed in claim 15, wherein the continuous time-decision feedback equalizer is utilized in a communication backplane channel application.

17. The method as claimed in claim 10, further comprising providing compensation for system variation due to at least one of a channel characteristic, an on-chip process, an on-chip voltage, an on-chip temperature, an on-chip noise, an off-chip noise, an off-chip long term drift, or an on-chip long term drift.

18. An apparatus implementing a continuous time-decision feedback equalizer, comprising:

a summer suitable for subtracting a filtered feedback signal from an input signal;

a symbol decision device suitable for receiving an output from the summer, a feedback filter suitable for filtering an output from the symbol decision device and for sending the filtered feedback signal to the summer, the feedback filter comprising an adjustable swing amplifier and an adjustable pole fitter;

an adaptation algorithm suitable for simultaneously adapting both a pole setting and a swing setting based upon a least mean squared error criteria, wherein the summer, the symbol decision device, and the feedback filter form a feedback circuit utilized to reconstruct an electrical signal distorted during transmission; and wherein the adaption algorithm is configured to minimize a means squared window duration through which transition crossings occur in the input signal.

19. The apparatus as claimed in claim 18, wherein the continuous time-decision feedback equalizer is utilized in a communication backplane channel application.

* * * * *